United States Patent

Stecker et al.

[11] 3,896,669
[45] July 29, 1975

[54] METHOD OF AND APPARATUS FOR TESTING THE SURFACE IRREGULARITIES OF A CARBON MONOFILAMENT

[75] Inventors: Glenroy H. Stecker, Johnson City; Michael Baud, Elizabethtown, both of Tenn.

[73] Assignee: The United States of America as represented by the Secretary of the Navy, Washington, D.C.

[22] Filed: Mar. 20, 1974

[21] Appl. No.: 452,908

[52] U.S. Cl. .................................................. 73/160
[51] Int. Cl.² ........................................ G01N 19/08
[58] Field of Search ................... 78/160, 105; 28/64

[56] References Cited
UNITED STATES PATENTS

| | | |
|---|---|---|
| 2,834,207 | 5/1958 | Chamberlain et al. ............... 73/160 |
| 3,058,343 | 10/1962 | Hutchens et al. ...................... 73/160 |
| 3,141,329 | 7/1964 | Canning................................. 73/160 |
| 3,504,552 | 4/1970 | Hiller..................................... 73/105 |

*Primary Examiner*—Richard C. Queisser
*Assistant Examiner*—John P. Beauchamp
*Attorney, Agent, or Firm*—R. S. Sciascia; P. Schneider

[57] ABSTRACT

A carbon monofilament to be tested for surface irregularities is moved under and relative to a second filament which it contacts. The tracking force between the two filaments is less than one gram. Whenever the second filament encounters a particle speck on the surface of the carbon monofilament a drag effect causes a horizontal displacement of the second filament. This horizontal displacement is used to generate an electrical signal which is input to an indicator, which may be a visual display or a permanent record.

17 Claims, 2 Drawing Figures

METHOD OF AND APPARATUS FOR TESTING THE SURFACE IRREGULARITIES OF A CARBON MONOFILAMENT

BACKGROUND OF THE INVENTION

This invention relates to a method of and apparatus for testing thin carbon monofilaments and determining their surface properties.

Aerospace technology has brought about many advances in materials science due to the necessity of finding materials which can withstand the demanding environment of space and the stresses accompanying launch and reentry of aerospace vehicles. The materials required for this stringent environment must have high rigidity, high strength and yet have low density. One such material, developed specifically for aerospace applications, is known as fiber reinforced composite material. This material is fabricated by embedding a number of thin filaments having high tensile strength in a resin, such as epoxy resin. The resulting material has a high directional strength parallel to the axis on which the embedded fibers run.

Applications for fiber reinforced composite material have not been limited to aerospace applications, however. Applications for this material have run from the more obvious ones, such as a structural material in aircraft panels, fuselage panels and airframe sections to more creative uses, such as for inertial energy storage devices, popularly known as flywheels. See *Scientific American*, December 1973, page 17, an article titled "Flywheels", or U.S. Pat. No. 3,787,141, showing a composite rotor assembly.

One filamentary material which has been used as the reinforcing fiber in a fiber-reinforced composite-material is a carbon monofilament (CMF). Micro-optical examination of carbon monofilaments reveals the presence of surface irregularities in the form of particle specks or spikes of material on the surface of the CMF. It has been shown that the presence of large numbers of these surface specks or particles or that large-sized surface specks or some combination of these will deleteriously affect the tensile and modulus properties of the boron-coated carbon monafilaments and ultimately of the fiber reinforced composite material. Consequently, in order to rapidly examine and efficiently test a production-size length of filament, it is necessary to have a method of and apparatus for generally characterizing, testing or determining the size and number of surface irregularities in a continuous and sequential fashion.

Previously, examination of the surface characteristics of filaments was accomplished by tedious, non-continuous methods, notably micro-optical examination. The result of this time consuming inspection method was the inability to adequately test production-sized lengths of the filament, and the inability to adequately test smaller lengths of the filament in an economical manner. Without techniques and apparatus for inspection of lengths of adequate size it was impossible to improve manufacturing methods by relating manufacturing changes to defects in the filament. Using the improvements made possible by the methods and apparatus of the present invention, however, the following results have been accomplished;

1. surface smoothness of the CMF has been improved,
2. improvements in manufacturing methods have been developed,
3. boron-coated CMF made by these improved manufacturing methods has exhibited improved tensile strength.

SUMMARY OF THE INVENTION

An object of the invention is to provide an improved method of and apparatus for continuously testing the size and number of surface irregularities of a carbon monofilament.

Another object of the invention is to enable the detection of the size and number of surface irregularities of a carbon monofilament by providing an intelligible record of surface properties of the filament which may then be related to its surface irregularities.

Yet another object is to continuously test the surface profile of production-size lengths of a carbon monofilament to enable the efficient production of large quantities of relatively smooth filaments.

Briefly, the invention for testing the surface irregularities of a carbon monofilament comprises placing a second length of filament under tension, resting the second length on the carbon monofilament to be tested while maintaining a tracking force therebetween of one gram or less and then moving the carbon monofilament to be tested relative to the second length. When the second filament encounters a particle speck on spike of material on the surface of the filament which is being tested, the second length is horizontally displaced a short distance, the exact distance of this "drag" effect depending on the height and length of the surface irregularity encountered. As the particle speck moves past, the second filament returns to its undisplaced position. This back-and-forth vibratory motion, which is representative of the surface irregularities of the first carbon monofilament, is translated into electrical signals by a generating means rigidly fixed to the holder of the second filament. These signals are indicated, which may be either a visual display or permanent record, or a combination of the two.

DESCRIPTION OF THE INVENTION

Figure 1:
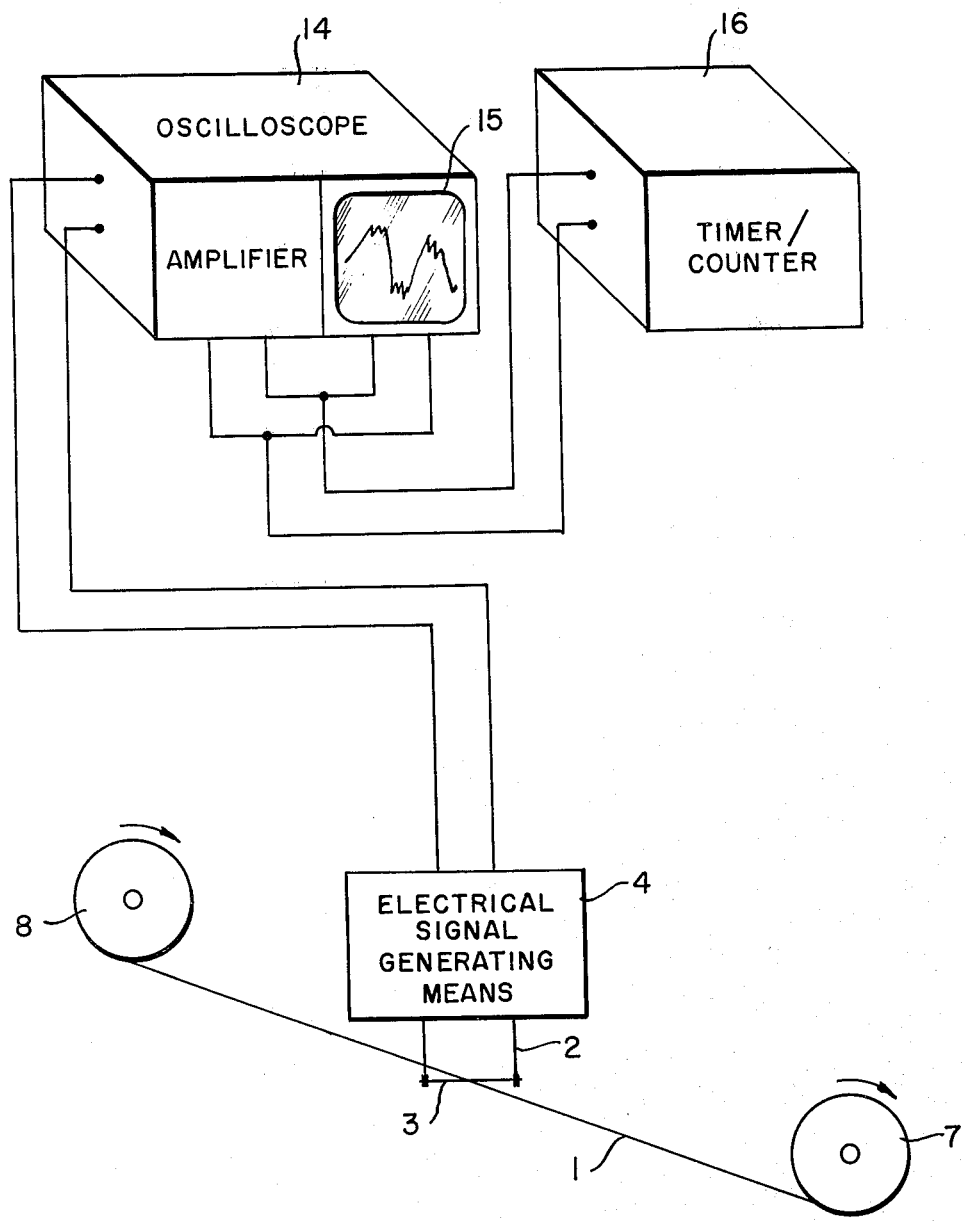
FIG. 1 is a schematic diagram of the components of the continuous testing apparatus.

The apparatus of the invention for the continuous testing of a carbon monofilament 1 comprises a holder 2 which holds a second length of filament 3 under tension. Filament 3 may be one of a number of filamentary materials with a diameter similar to that of the filament to be tested, for example carbon monofilament or tungsten filament. The holder 2 is rigidly fixed to a device 4 for generating electrical signals, for example the cartridge of a phonograph-type pickup 5 which are components of phonograph 6. The filament 1 to be tested is stored on two reels, a storage or take-up reel 7 and a supply reel 8. The take-up reel 7 is directly connected to the shaft of an electric motor 9, and the supply reel 8 is supported by support 10. The filament 1 is positioned by means of front guide 11 and a rear guide 12 which also serves as a braking or tensioning means for the filament 1. All of the continuous testing apparatus may be mounted on a table 13.

The output of the electrical signal generating means is first amplified by the amplifier of phonograph 6, then amplified again by the amplifier of oscilloscope 14 and then indicated either by visual display on the screen 15 of oscilloscope 14 or by permant record by the timer/-counter 16 of FIG. 1 or by a combination of both. Generation of the signal, amplification and indication may be accomplished by any conventional means, however and are not limited to those shown in this particular embodiment of the invention.

Figure 2:
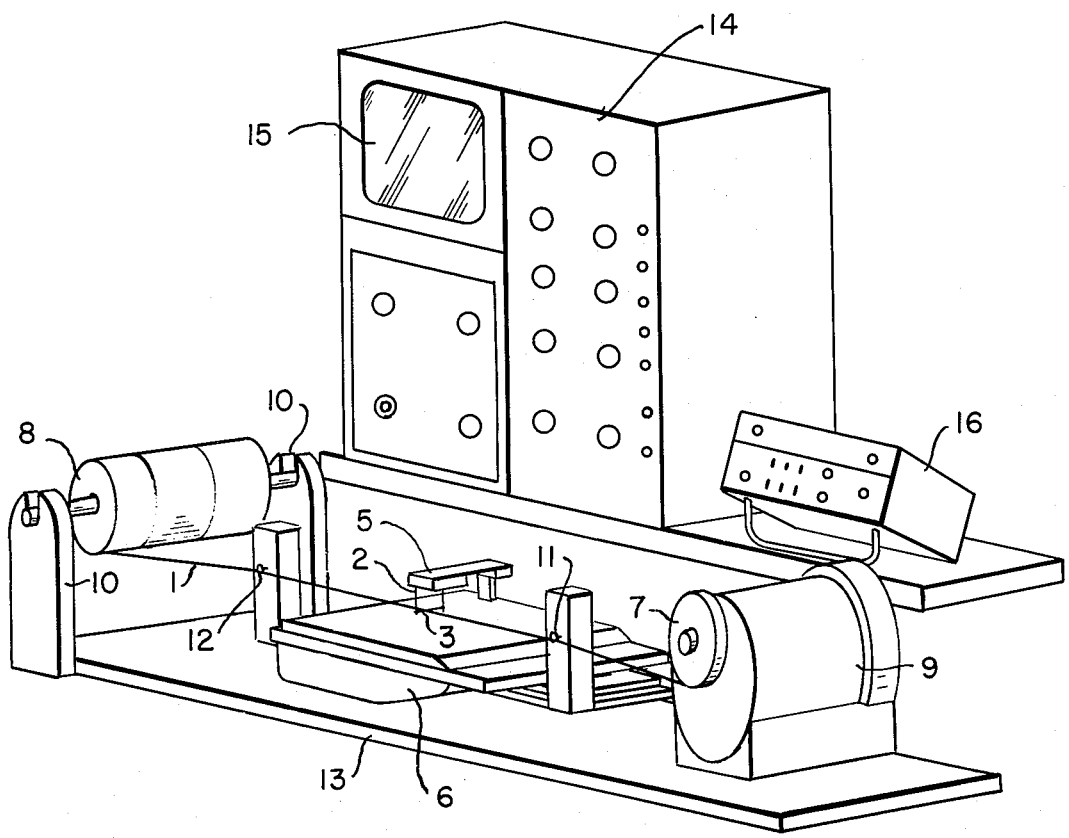
FIG. 2 is a perspective view of the components of the continuous filament-testing apparatus.

The method by which this apparatus is used to continuously test the surface profile of a carbon monofilament is generally illustrated in FIG. 2. The carbon monofilament 1 is continuously advanced linearly relative to the second filament 3 which is held under tension by holder 2. Filament 3 is positioned so that it rests on and contacts the first filament 1. Filament 3 may be held in bow-like manner by its holder 2 while the filament 1 moves past it at a constant speed. Filament 1 is advanced from the supply reel 8 to the take-up reel 7 by means of electric motor 9, the shaft of which is directly connected to take-up reel 7. Filament 1 may be positioned by means of guides 11 and 12 so that a predetermined, linear path for this filament is assured in the region where it contacts filament 3. Guide 12 is also provided with a braking or tensioning means, to insure that filament 1 is taut in this region. As filament 1 moves past filament 3, which it engages, filament 3 moves horizontally in response to the surface irregularities of filament 1. Thus, filament 3 will be "dragged" along horizontally when it encounters a particle speck or spike on the surface of filament 1 and then return to its undisplaced position when the speck has moved past it, producing a vibratory motion by filament 3. Contact is maintained between the two filaments 1 and 3 by virtue of the weight of holder 2, cartridge 4 and pickup arm 5, which all bear on the point of contact between the two. This weight, however, must be offset to prevent breaking of carbon monofilament to be tested. A maximum tracking force of one gram should be maintained between the two filaments to prevent breakage. As filament 3 vibrates horizontally, cartridge 4 will generate an electrical signal in a known manner. The signal is carried by pickup arm 5 and is amplified in the phonograph 6. The signal is then amplified again by oscilloscope 14 and indicated, as by recording by timer/counter 16, display on oscilloscope screen 15 or a combination of both. The data may then be analyzed and correlated to the other properties of the filament which will determine its utility as a reinforcing fiber in a composite material.

As an example of the data produced by one embodiment of the invention, as illustrated by FIG. 1, three lengths of a carbon monofilament which were tested for surface irregularities were analyzed and the data is listed below. The CMF tested was in all cases moved at a speed of one inch per second past a second CMF held under tension by a holder made of piano wire. The holder was attached to the cartridge of a Panasonic model SG-336 monaural battery-powered phonograph pickup. The full volume output of the phonograph was input to a Tektronix Type 535A oscilloscope with C-12 oscilloscope camera. The vertical signal was in turn input to Channel B of a Hewlett-Packard 5304A measurement system and 5304 timer/counter module at an attenuation setting of X100. The oscilloscope was swept at constant intervals and the trigger level of the timer/counter was adjusted to a constant setting and the count of the number of peaks or maxima was varied by varying the oscilloscope amplification output setting sequentially through four levels, 2, 1, 0.5 and 0.2 mv.cm. It is also possible to vary the trigger level to obtain counts at various levels of amplitude output from the oscilloscope. The three samples consisted of a typical smooth carbon monofilament with occasional surface projections visible under microscopic examination at 400X (Sample A), a moderately rough carbon monofilament with a relatively large number of very small surface projections (Sample B), and a carbon monofilament with approximately the same number of surface projections as Sample B, but with a visually greater average size (Sample C). The data thus obtained is as follows:

| CMF Sample | Oscilloscope Amplitude Setting | Average Counts per Second (per Inch) |
|---|---|---|
| A | 2 mv/cm | 1.6 |
|  | 1 | 3.1 |
|  | 0.5 | 11.3 |
|  | 0.2 | 86.4 |
| B | 2 | 1.4 |
|  | 1 | 3.8 |
|  | 0.5 | 24.0 |
|  | 0.2 | 259.3 |
| C | 2 | 2.6 |
|  | 1 | 29.7 |
|  | 0.5 | 107.0 |
|  | 0.2 | 324.8 |

It will thus be observed that depending upon the amplitude setting of the oscilloscope and the trigger level of the counter small and/or large surface irregularities in the form of particles or specks on the surface of the advancing carbon monofilament can be detected and counted, thereby enabling the production of a filament having enhanced properties, in a more efficient and economical manner.

Modifications and variations of the present invention are possible in light of the above teachings. It is therefore to be understood that, within the scope of the appended claims, the invention may be practiced otherwise than as specifically described.

What is claimed is:

1. Apparatus for continuously testing for surface irregularities of a first carbon monofilament comprising;
   a. a second filament adapted to contact and rest on the first carbon monofilament,
   b. means for linearly moving the first filament relative to the second filament thereby causing vibration of the second filament in the presence of surface irregularities on the first filament,
   c. means responsive to the vibration of the second filament in the presence of said surface irregularities for generating an electrical signal representative of said surface irregularities,
   d. indicating means responsive to the electrical signal generating means,
   e. adjustable means for tensioning the first filament to provide the proper response of the second filament relative to the varying sizes of the surface irregularities on the first filament.

2. The apparatus of claim 1 in which the indicating means is a displaying means.

3. The apparatus of claim 1 in which the indicating means is a recording means.

4. The apparatus of claim 2 which includes a means for recording the electrical signals.

5. The apparatus of claim 1 in which the signal generating means is a monaural phonograph having a cartridge and pickup arm.

6. The apparatus of claim 1 in which the means for moving the first filament is an electric motor.

7. The apparatus of claim 1 in which the second filament is a carbon monofilament.

8. The apparatus of claim 1 in which the second filament is a tungsten filament.

9. The apparatus of claim 1 in which the indicating means includes an oscilloscope and a counter.

10. The apparatus of claim 9 including means for maintaining the trigger level of the counter constant and means for varying the amplification output level of the oscilloscope sequentially through a plurality of levels.

11. Apparatus for continuously testing for the surface irregularities of a first carbon monofilament comprising;
   a. a second filament adapted to contact and rest on the first filament with a tracking force therebetween of no more than one gram,
   b. an electric motor for linearly moving the first filament past the second filament thereby causing vibration of the second filament in the presence of surface irregularities on the first filament,
   c. a monaural phonograph and cartridge connected to the second filament responsive to the vibration of the second filament in the presence of said surface irregularities for generating electrical signals representative of that vibration,
   d. an oscilloscope responsive to the electrical signals, and a counter for recording the electrical signals,
   e. adjustable means for tensioning the first filament to provide the proper response of the second filament relative to the varying sizes of the surface irregularities on the first filament.

12. A method of continuously testing the surface irregularities of a carbon monofilament comprising;
   a. moving said filament linearly past and in contact with a second filament while maintaining a tracking force therebetween of no more than one gram,
   b. generating an electrical signal representative of the surface irregularities of the first filament,
   c. providing an indication representative of said electrical signal, and
   d. adjusting the tension of the first filament to provide the proper response of the second filament relative to the varying sizes of the surface irregularities of the first filament.

13. The method of claim 12 in which indicating the electrical signal comprises recording said signal.

14. The method of claim 12 in which indicating the electrical signal comprises displaying said signal.

15. The method of claim 12 in which indicating the electrical signal comprises recording and displaying said signal.

16. The method of claim 12 in which the second filament is a carbon monofilament.

17. The method of claim 12 in which the second filament is a tungsten filament.

* * * * *